United States Patent
Drucker

(10) Patent No.: US 8,072,313 B2
(45) Date of Patent: Dec. 6, 2011

(54) RFID INTERROGATOR WITH IMPROVED SYMBOL DECODING AND SYSTEMS BASED THEREON

(76) Inventor: Vitaly Drucker, Stamford, CT (US)

(*) Notice: Subject to any disclaimer, the term of this patent is extended or adjusted under 35 U.S.C. 154(b) by 1303 days.

(21) Appl. No.: 11/669,521

(22) Filed: Jan. 31, 2007

(65) Prior Publication Data

US 2007/0188305 A1    Aug. 16, 2007

Related U.S. Application Data

(60) Provisional application No. 60/764,111, filed on Feb. 1, 2006.

(51) Int. Cl.
- H04Q 5/22 (2006.01)
- G05B 23/02 (2006.01)
- H04L 27/06 (2006.01)
- H04L 7/00 (2006.01)

(52) U.S. Cl. ............... 340/10.4; 340/10.5; 340/3.21; 375/340; 375/368

(58) Field of Classification Search ............ 340/10.51; 370/405
See application file for complete search history.

(56) References Cited

U.S. PATENT DOCUMENTS

| | | | |
|---|---|---|---|
| 3,997,847 A | 12/1976 | Tong | |
| 5,399,987 A | 3/1995 | Yamamoto et al. | |
| 5,778,031 A | 7/1998 | Hiramatsu | |
| 5,784,686 A | 7/1998 | Wu et al. | |
| 5,892,797 A * | 4/1999 | Deng | 375/361 |
| 6,031,862 A | 2/2000 | Fullerton et al. | |
| 6,456,668 B1 | 9/2002 | MacLellan et al. | |
| 6,587,517 B1 | 7/2003 | Li et al. | |
| 6,608,552 B1 | 8/2003 | Fogel et al. | |
| 6,938,200 B2 * | 8/2005 | Pax et al. | 714/798 |
| 6,950,009 B1 | 9/2005 | Nysen | |
| 7,117,374 B2 * | 10/2006 | Hill et al. | 713/193 |
| 7,193,506 B2 * | 3/2007 | Logvinov et al. | 340/310.11 |
| 2001/0010694 A1 * | 8/2001 | Lindsey et al. | 370/405 |
| 2004/0201457 A1 * | 10/2004 | O'Toole et al. | 340/10.33 |
| 2005/0099270 A1 | 5/2005 | Diorio et al. | |
| 2005/0143671 A1 * | 6/2005 | Hastings et al. | 600/513 |
| 2007/0152833 A1 * | 7/2007 | Kaplan et al. | 340/572.8 |

FOREIGN PATENT DOCUMENTS

EP    0915573    5/1999

OTHER PUBLICATIONS

"Digital Modulation in Communications Systems—An Introduction", Application Note 1298, Hewlett-Packard Company, Jul. 1997.
EPC® Radio-Frequence identity Protocols Class-1 Generation-2 UHF RFID Protocol for Communications at 860 MHz-960 MHz, Version 1.0.9, EPCglobal Inc., 2004.
"FSK: Signals and Demodulation", Bob Watson, Copyright© 1980 Watkins-Johnson Company, vol. 7 No. 5 Sep./Oct. 1980.
"A Radio-Oriented Introduction to RFID-Protocols, Tags and Applications" Daniel M. Dobkin, Titus Wandinger, Aug. 2005 High Frequency Electronics, 2005 Summit Technical Media.

(Continued)

*Primary Examiner* — Daniel Wu
*Assistant Examiner* — Pameshanand Mahase
(74) *Attorney, Agent, or Firm* — Gordon & Jacobson, PC

(57) ABSTRACT

An improved Interrogator for use in a radio frequency identification system wherein at least one tag modulates a radio frequency signal by modulated backscatter operations.

28 Claims, 13 Drawing Sheets

OTHER PUBLICATIONS

Digitally Demodulating Binary Phase Shift Keyed Data Signals, Cornellis J. Kikkert, Craig Blackburn, Electrical and Computer Engineering, James Cook University.

"Passive, Battery-assisted Passive and Active Tags: A Technical Comparison" © 2005 Intelleflex Corporation.

Digital Receivers: Symbol-Timing Recovery for QPSK, Jones, Appadwedula, Berry, Haun, Janevits, Kramer, Moussa, Sachs, Wade, The Connexions Project,Version 2.14: Oct. 11, 2004.

"Minimum Shift Keying: A Spectrally Efficient Modulation", Subbarayan Pasupathy, IEEE Communications Magazine, Jul. 1979.

PSK Demodulation (Part 1) J. Mark Steber, The Communications Edge™, vol. 11 No. 2 Mar./Apr. 1984.

PSK Demodulation (Part 2) J. Mark Steber, The Communications Edge™, vol. 11 No. 2 Mar./Apr. 1984.

"Transmitter & Receiver Architectures", Andrew Bateman, Radio Design Course, downloaded Nov. 2, 2005, http://www.avren.com/Courses/TX_RX_Architectures_plain.htm "860MHz-930MHz Class I Radio Frequency Identification Tag Radio Frequency & Logical Communication Interface Specification Candidate Recommendation".

Technical Report, Version 1.0.1, Auto-ID Center, Nov. 14, 2002.

"Bringing Long-Range UHF RFID Tags Into Mainstream Supply Chain Applications" Rob Glidden, John Schroeter, www.rfdesign.com, Jul. 2005.

Noncoherent Communication With Waveforms, Marvin Simon, Digital Communication Techniques: Signal Design and Detection, Chapter 5.

UHF Gen 2 System Overview, Texas Instruments, JAG. Mar. 2005.

Proposed Changes, Impinj, dated Mar. 8, 2005, available from www.antoid.org.

"Digitally Demodulating Binary Phase Shift Keyed Data Signals, C. Kikkert and C. Blackburn, Information and Comunication Security, 2nd Int'l Conference, ICICS99, 1999.

"860MHz-930MHz Class I Radio Frequency Identification Tag Radio Frequency & Logical Communication Interface Specification Candidate Recommendation", Auto-ID Center, 2002.

"Noncoherent Communication With Waveforms", Marvin Simon, Digital Communication Techniques: Signal Design and Detection, Chapter 5, Prentice Hall, 1994.

\* cited by examiner

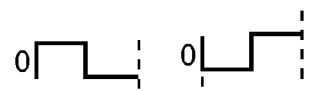
*Fig. 3A1*
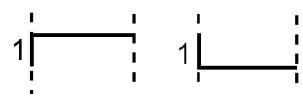
*Fig 3A2*

FM0 Preamble (TRext=0)

FM0 Preamble (TRext=1)

FM0 End-of-Signaling $S_0$ basis function - odd (data=0)

$S_0$ basis function - even (data=0)

Composite $S_0$ basis function (data=0)

RFID INTERROGATOR WITH IMPROVED SYMBOL DECODING AND SYSTEMS BASED THEREON

This application claims the benefit of provisional application Ser. No. 60/764,111 filed Feb. 1, 2006 which is hereby incorporated by reference herein in its entirety.

BACKGROUND OF THE INVENTION

1. Field of the Invention

This invention relates broadly to wireless communication systems and, more particularly, to demodulation and decoding of a backscatter radio frequency signal in a radio frequency identification system.

2. State of the Art

Radio Frequency Identification (RFID) systems are used for identification and/or tracking of equipment, inventory, or living things. RFID systems are radio communication systems that communicate between a radio transceiver, called an Interrogator, and a number of inexpensive devices called Tags. The objectives of RFID systems are to design a reliable and secure architecture, and to minimize the total cost of the Interrogator and the Tags, while meeting the system performance requirements.

In RFID systems, the Interrogator communicates to the Tags using modulated radio signals, and the Tags respond with modulated radio signals. For downlink communication from the Interrogator to a Tag, the Interrogator transmits a modulated radio signal that encodes the Interrogator's message. The Tag receives the modulated radio signal and demodulates and decodes the Interrogator's message therefrom. For uplink communication from a Tag to the Interrogator, the Interrogator transmits a continuous-wave (CW) carrier signal. The CW carrier signal can be a frequency-hopping spread-spectrum (FHSS) carrier signal as is well known, thereby enhancing the system's ability to operate in a multipath environment. The Tag modulates the CW carrier signal using modulated backscattering operations whereby the antenna is electrically switched from being an absorber of RF radiation to being a reflector of RF radiation, thereby encoding the Tag's information onto the CW carrier signal. The Interrogator receives the incoming modulated CW carrier signal and demodulates and decodes the Tag's information message therefrom. The uplink and downlink communication occurs in a half-duplex manner such that a Tag will not perform communication while it is waiting for communication from an Interrogator and also will not interpret communication from the Interrogator while it is communicating. The Tag can be a passive-type tag that obtains its operating energy by rectifying the RF energy transmitted by the Interrogator and received at the Tag's antenna. Alternatively, the Tag can be a semi-passive tag (sometimes referred to as semi-active tag) that is equipped with at least one battery to provide operating energy to the Tag.

As described above, the Interrogator operates to receive the reflected and modulated CW carrier signal and demodulate and decode the Tag information message encoded therein. Typically, such functionality is accomplished by homodyne detection wherein the received signal is amplified with a low noise amplifier whose output is mixed by a quadrature mixer that uses the same RF signal source as the transmit functionality. The in-phase (I) and quadrature (Q) components output from the quadrature phase mixer are filtered and processed by a data recovery circuit. The data recovery circuit can be realized in many different ways including both analog, digital and hybrid analog/digital implementations. Typically, these implementations perform integrate and dump operations whereby the signal energy of the I component and/or Q component is (are) accumulated during a symbol period. The accumulated value(s) is (are) supplied to a symbol decision comparator that produces the demodulated data stream. An example of such a receiver implementation is described in U.S. Pat. No. 6,456,668 to MacLellan et al.

Disadvantageously, the integrate and dump methodology of the prior art receiver designs has poor performance because it provides limited knowledge of the energy of the signal as well as the noise process of the communication channel. These limitations reduce the signal to noise ratio of the receiver subsystem, which results in increased signal power at the Tag (or decreased read range of the system) in order to maintain a prescribed bit error rate. The increased signal power at the Tag is typically realized by a larger Tag antenna, which increases the size and costs of the Tag.

Therefore, there remains a need in the art for RFID Interrogators and RFID systems based thereon that provide improved receiver performance (i.e., an improved signal to noise ratio) which allows for reduced signal power at the Tag (or a larger read range of the system) while maintaining a prescribed bit error rate. Such improved receiver performance advantageously will not require an increase in the size and cost of the Tag.

SUMMARY OF THE INVENTION

It is therefore an object of the invention to provide an RFID Interrogator and RFID systems based thereon that provide improved receiver performance (i.e., an improved signal to noise ratio). Such improved performance allows for reduced signal power at the Tag (or a larger read range of the system) while maintaining a prescribed bit error rate. The reduction of signal power at the Tag allows for smaller and less costly Tag designs while maintaining the prescribed bit error rate of the system.

It is another object of the invention to provide such an RFID Interrogator and Systems based thereon that employ a form of biphase encoding for uplink communication from the Tag to the Interrogator.

It is a further object of the invention to provide such an RFID Interrogator and Systems based thereon that employ a form of a modulated subcarrier encoding for uplink communication from the Tag to the Interrogator.

In accord with these objects, which will be discussed in detail below, an improved Interrogator is provided for use in a radio frequency identification system wherein at least one tag modulates a radio frequency signal by modulated backscatter operations. The modulated radio frequency signal transmitted by the at least one tag encodes an uplink message that is represented by a sequence of symbols each corresponding to at least one bit of the uplink message. The symbol sequence is transmitted at a symbol rate with a corresponding symbol period. The Interrogator includes a transmitter that transmits the radio frequency signal and a receiver that receives, demodulates and decodes the modulated radio frequency signal in order to recover the uplink message therein. The receiver includes a symbol decoder that decodes a given symbol by operating on portions of a component of the modulated radio frequency signal that are received over an extended processing window. The extended processing window is significantly greater than the symbol period. In the preferred embodiment of the present invention, the extended processing window has a time duration that is two times the symbol period and includes a first part (e.g., $-T/2$ to 0) that precedes the symbol period for the given symbol and a second part (e.g., T to 3T/2) that follows the symbol period for the given symbol.

It will be appreciated that such processing provides improved receiver performance (i.e., an improved signal to noise ratio). Such improved performance allows for reduced signal power at the Tag (or a larger read range of the system) while maintaining a prescribed bit error rate. The reduction of signal power at the Tag allows for smaller and less costly Tag designs while maintaining the prescribed bit error rate of the system.

According to one embodiment of the invention, the symbol decoder includes reference signal generation means for generating at least one reference signal that varies over a time duration corresponding to the extended processing window, multiplication means for samplewise multiplication of portions of the component of the modulated radio frequency signal with portions of the at least one reference signal; and accumulation means for accumulating results of the multiplication means over the extended processing window. In digital implementations, the samplewise multiplication may be realized by changing the sign of samples of the modulated radio frequency signal component in accordance with the reference signal(s) portions.

According to another embodiment of the invention, the symbol decoder employs multiple signal processing paths for carrying out odd symbol processing in parallel with even symbol processing.

According to yet another embodiment of the invention, the symbol decoder employs signal processing paths that each employ a respective storage cell for storing the accumulation results from the previous processing window. The stored accumulation results are added to the accumulation results of the current processing window for carrying out symbol processing in the extended processing window.

Additional objects and advantages of the invention will become apparent to those skilled in the art upon reference to the detailed description taken in conjunction with the provided figures.

BRIEF DESCRIPTION OF THE DRAWINGS

FIGS. 3A1 and 3A2 are pictorial illustrations of the data-0 and data-1 symbols, respectively, of an FM0 baseband waveform, which may be used for Tag-to-Interrogator signaling in the RFID system of FIG. 1.

DETAILED DESCRIPTION OF THE PREFERRED EMBODIMENTS

Figure 1:
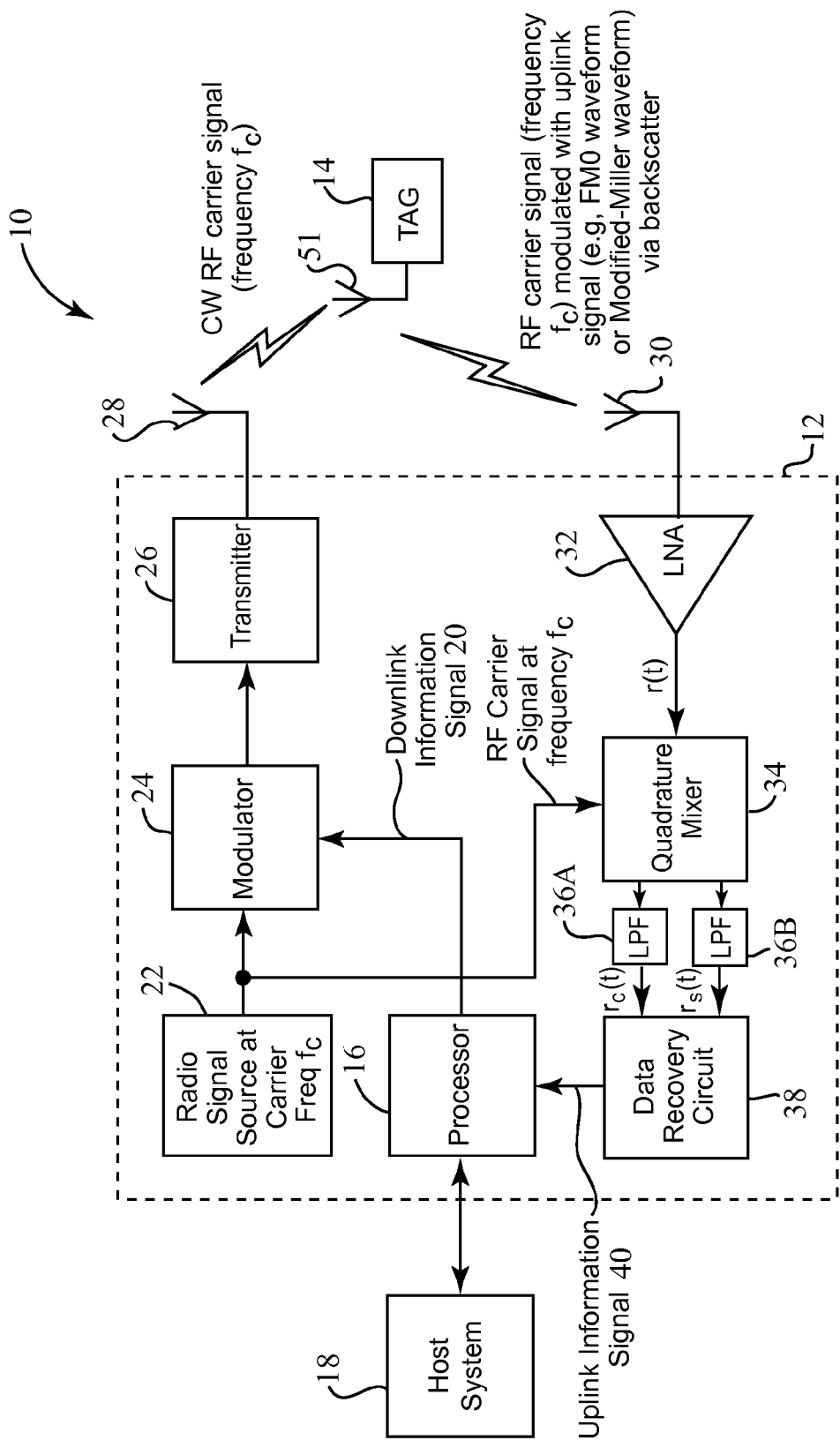
FIG. 1 is a functional block diagram of an RFID system in which the present invention can be embodied.

Turning now to FIG. 1, there is shown an RFID system 10 that embodies the present invention. The RFID system 10 includes an Interrogator 12 that operates to read information from a Tag 14 affixed to a sensor, container, rack, pallet, or object (not shown). Typically, the Tag 14 is moved across the reading field of the Interrogator 12, although the Tag 14 may be stationary and the Interrogator 12 may be moving, or both may be moving or stationary. The reading field is defined as that volume of space within which successful communications between the Interrogator 12 and the Tag 14 can take place. While the Tag 14 is in the reading field, the Interrogator 12 and the Tag 14 must complete their information exchange before the Tag 14 moves out of the reading field.

The Interrogator 12 includes a Processor 16 that typically interfaces to a host system 18 (e.g., a workstation or possibly a network interface that provides for communication to a remote system via a data network). The Processor 16 manages the communication interface between the Interrogator 12 and the Tag 14. The host system 18 interfaces with the Processor 16 and directs the communication between the Interrogator 12 and the Tag 14. In response to control commands supplied by the host system 18, the Processor 16 generates commands (e.g., Select, Query, Read, Write, Kill) that are formatted and encoded within a Downlink Information Signal 20 to be sent to the Tag 14. Signal Source 22 generates a continuous-wave RF carrier signal with a center frequency designated $f_c$. Modulator 24 modulates the Downlink Information Signal 20 onto the continuous-wave RF carrier signal, and the Transmitter 26 sends this modulated RF signal via Antenna 28 to the Tag 14.

The Tag 14 includes an Antenna 51 (for example, a loop or patch antenna) that receives the modulated RF carrier signal. This signal is demodulated to a baseband signal using a detector/modulator (not shown), which is typically realized by a single Schottky diode. The diode should be appropriately biased with the proper current level in order to match the impedance of the diode and the Antenna 51 such that losses of the radio signal are minimized. The result of the diode detector is essentially a demodulation of the incoming signal directly to baseband. The binary levels of the baseband signal together with the relevant timing information (e.g., the bit clock) are recovered from the baseband signal to thereby reproduce the Downlink Information Signal 20. This information is typically supplied to a processor (not shown), which is typically realized by an inexpensive 4-bit or 8-bit microprocessor, that processes the Downlink Information Signal 20 to recover the particular command therein. The microprocessor then performs certain operations that are dictated by the particular command and generates a reply corresponding thereto. For example, the microprocessor typically performs memory access operations that retrieves identification data (e.g., EPC data) stored in persistent memory in response to a Read command, and adds the retrieved identification data to the reply. The reply is formatted and encoded within an Uplink Information Signal 40 to be sent from the Tag 14 back to the Interrogator 12. The Tag modulates the received CW carrier signal using modulated backscattering operations whereby the antenna is electrically switched from being an absorber of RF radiation to being a reflector of RF radiation. Such modulated backscatter operations modulate the Uplink Information Signal 40 onto the received CW carrier signal. The Interrogator 14 receives the incoming modulated CW carrier signal via antenna 30, demodulates and decodes the Uplink Information Signal 40 therefrom, extracts the Tag's reply message from the Uplink Information Signal 40, and processes the Tag's reply message in order to determine subsequent control operations, all as described in detail hereinafter In the preferred embodiment, the downlink and uplink communications between the Interrogator 12 and Tag 14 (including the physical layer, data-coding methodology, command and response structure, and collision arbitration scheme) are carried out in accordance with a standardized air interface specification promulgated by EPCglobal Inc. entitled "Class-1 Generation 2 UHF RFID Protocol for Communications at 860 MHz-960 MHz", which is summarized and referred to below as the EPCglobal UHF protocol. The specification can be downloaded from http://www.epcglobalinc.org/standards_technology/EPCglobalClass-1Generation-2UHFRFIDProtocolV109.pdf and is herein incorporated by reference in its entirety.

In accordance with the EPCglobal UHF protocol, downlink communication from the Interrogator 12 to the Tag 14 is carried out by the Radio Signal Source 22 generating an RF carrier in the frequency range between 860 MHz and 960 MHz. The Processor 16 and modulator 24 cooperate to modulate the RF carrier in accordance with the Downlink Information Signal 20 using one of three well-known amplitude modulation schemes (i.e., Double-Side-Band Amplitude Shift Keying (DSB-ASK), Single-Side-Band Amplitude Shift Keying (SSB-ASK), Phase-Reversal Amplitude Shift Keying (PR-ASK)). The Downlink Information Signal 20 utilizes a pulse-interval encoding (PIE)) format. The Transmitter 26 transmits the modulated RF carrier over the Antenna 28. The Tag 14 is capable of receiving the modulated RF carrier and demodulating all three amplitude modulation schemes and decoding the pulse-interval encoded waveforms of the Downlink Information Signal 20. The Tag 14 is a passive-type tag that receives its operating energy from the modulated RF carrier transmitted by the Interrogator 12. The Radio Signal Source 22 may generate a frequency-hopping spread-spectrum (FHSS) carrier signal in order to enhance the system's ability to operate in a multipath environment. The Tag 14 stores a field-programmable 96-bit electronic product code (EPC) along with other data (e.g., KILL and ACCESS passwords, user-defined data).

Uplink communication from a Tag to the Interrogator is carried out by the Radio Signal Source 22, Modulator 24 and Transmitter 26 cooperating to transmit via the Antenna 28 a continuous-wave RF carrier in the frequency range between 860 MHz and 960 MHz. The CW carrier signal can be a frequency-hopping spread-spectrum (FHSS) carrier signal as is well known, thereby enhancing the system's ability to operate in a multipath environment. As previously mentioned, the Tag 14 modulates the CW carrier signal using modulated backscattering operations whereby the antenna is electrically switched from being an absorber of RF radiation to being a reflector of RF radiation, which modulates the Tag's Uplink Information Signal 40 onto the CW carrier signal.

Figure 2A:
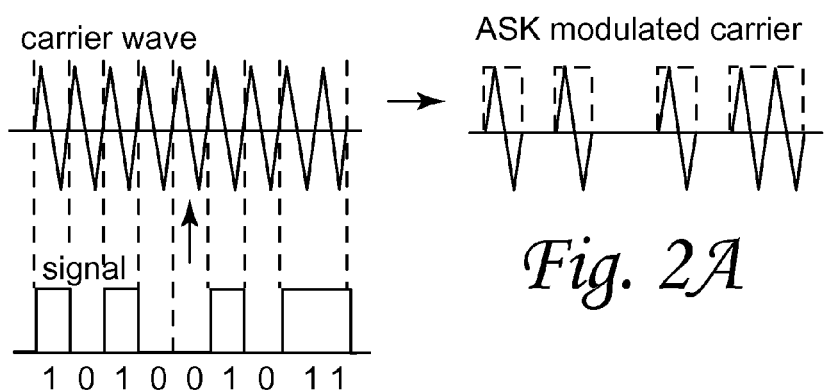
FIG. 2A is a pictorial illustration depicting amplitude shift keying modulation.

The modulated backscattering operations employ either amplitude shift keying (ASK) modulation or phase shift keying (PSK) modulation. ASK modulation is a modulation technique whereby the CW carrier signal is multiplied by a digital signal f(t) as shown in FIG. 2A. Mathematically, the modulated CW carrier signal s(t) is given by the following expression:

$$s(t)=f(t)\sin(2\pi f_c t+\phi).$$

PSK is modulation technique that alters the phase of the CW carrier signal. Mathematically, the modulated CW carrier signal s(t) is given by the following expression:

$$s(t)=\sin(2\pi f_c+\phi(t)).$$

Figure 2B:
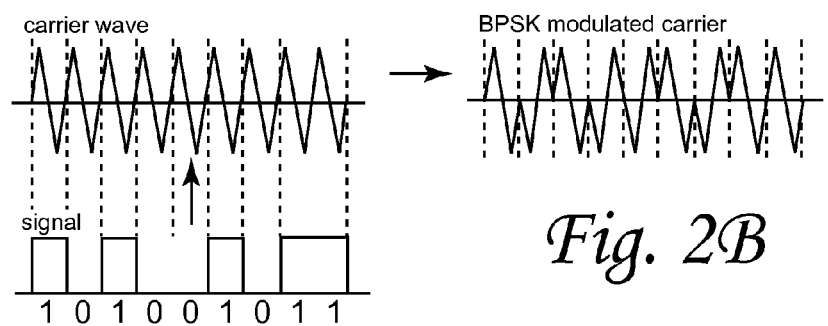
FIG. 2B is a pictorial illustration depicting phase shift keying modulation.
Figure 3B:
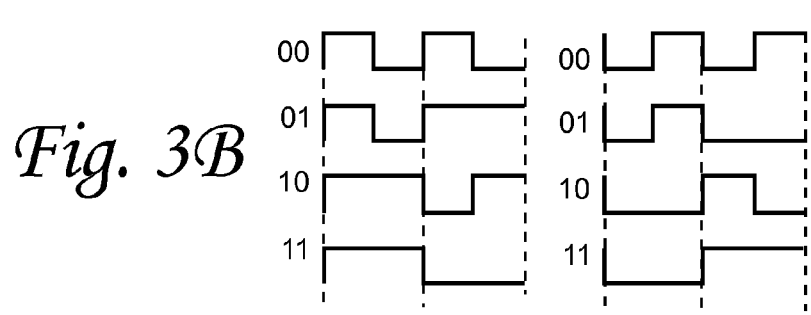
FIG. 3B is a pictorial illustration of symbol sequences of an FM0 baseband waveform, which may be used for Tag-to-Interrogator signaling in the RFID system of FIG. 1.

Binary phase-shift-keying (BPSK) utilizes only two phases, 0 and $\pi$. It is therefore a type of ASK with f(t) taking the values −1 or 1. Quadrature phase-shift-keying (QPSK) has four phases, 0, $\pi/2$, $\pi$, and $3\pi/2$. M-ary PSK has M phases, given by $2\pi m/M$ with m=0, 1, ... (M−1). Binary phase-shift keying is shown in FIG. 2B.

Figure 4A:
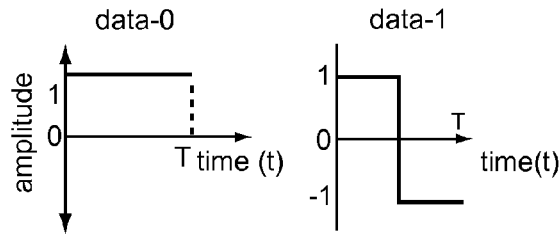
FIG. 4A is a pictorial illustration of the data-0 and data-1 symbols of a Miller-modulated waveform, which may be used for Tag-to-Interrogator signaling in the RFID system of FIG. 1.
Figure 4B:
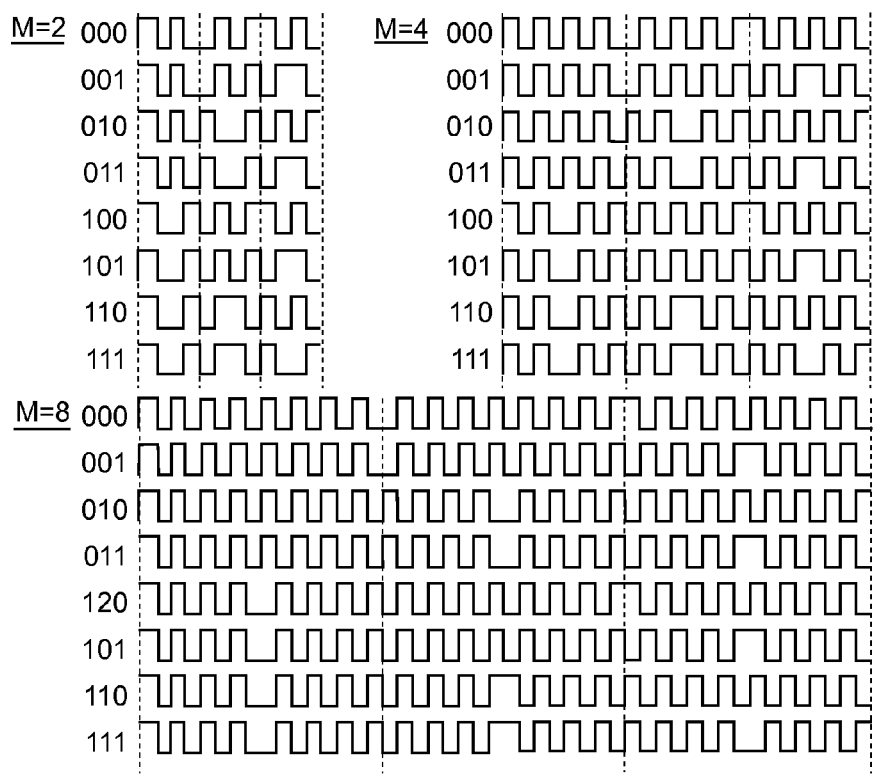
FIG. 4B is a pictorial illustration of symbol sequences of a Miller-modulated waveform, which may be used for Tag-to-Interrogator signaling in the RFID system of FIG. 1.

The Tag 14 encodes its Uplink Information Signal 40 as either an FM0 baseband waveform or a Miller-modulated subcarrier waveform. The FM0 symbols and sequences are shown in FIGS. 3A1, 3A2 and 3B. The FM0 baseband waveform inverts the baseband phase at every symbol boundary with the data-0 symbol having an additional mid-symbol phase inversion. The Miller-modulated subcarrier symbols and sequences are shown in FIGS. 4A and 4B, respectively. The baseband Miller signal inverts its phase between two data-0 symbols in sequence and also places a phase inversion in the middle of a data-1 symbol. The Miller-modulated subcarrier waveform is generated by multiplying the baseband Miller signal with a square wave at M times the symbol rate. Thus, the M=2 Miller-modulated subcarrier waveform contains 2 subcarrier cycles per bit, the M=4 Miller-modulated subcarrier waveform contains 4 subcarrier cycles per bit, and the M=8 Miller-modulated subcarrier waveform contains 8 subcarrier cycles per bit.

The receiver subsystem of the Interrogator 12, which is described below in more detail, is capable of demodulating an ASK modulated carrier signal or a PSK modulated carrier signal. The receiver subsystem receives the incoming modulated CW carrier signal and demodulates the modulated CW carrier signal to generate in-phase and quadrature signals. The binary levels of the in-phase and quadrature signals together with the relevant timing information (e.g., the bit clock) are recovered therefrom to thereby reproduce the Uplink Information Signal 40. The Processor 16 recovers the Tag's reply message from the Uplink Information Signal 40. The Processor 16 selects the encoding scheme (FM0 baseband encoding or one of the three Miller-modulated subcarrier schemes) and the data rate of the Uplink Information Signal 40 by means of a command (i.e., Query command) communicated from the Interrogator 12 to the Tag 14 via the Downlink Information Signal 20.

The Interrogator 12 and the Tag 14 communicate with one another by a pre-arranged signaling scheme whereby the Interrogator 12 transmits one or more commands (referred to below as Interrogator-to-Tag signaling) and waits for certain replies from the one or more Tags of the system (referred to below as Tag-to-Interrogator signaling). Such reply messages can include randomly-generated data (RN16, which is 16 bits randomly-generated by the Tag), protocol control data (PC data field), identification data (EPC data) stored by the Tag, and error detection data (CRC data) generated by the Tag. More than one Tag may reply to an Interrogator's Query command. In this case, the Interrogator 12 may resolve the collision and issue an ACK command to the selected Tag. Alternatively, the Interrogator 12 may not resolve the collision and issue a QueryAdjust, QueryRep or NAK command, which allows for arbitration of the collided Tags.

Figure 5A:
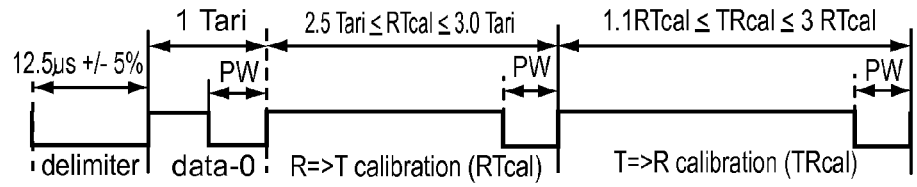
FIG. 5A is a pictorial illustration of a preamble waveform that precedes each Query command as part of Interrogator-to-Tag signaling in the RFID system of FIG. 1.
Figure 5B:
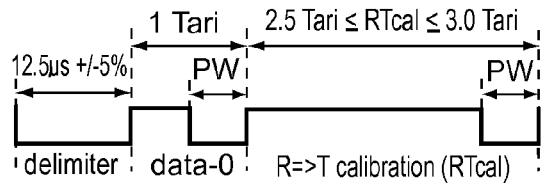
FIG. 5B is a pictorial illustration of a frame-synch waveform that precedes other commands (e.g., Select, ACK, Read, Write, Kill) as part of Interrogator-to-Tag signaling in the RFID system of FIG. 1.

The Processor 16 initiates Interrogator-to-Tag signaling by cooperating with the Signal Source 22, Modulator 24 and Transmitter 26 to transmit via the Antenna 28 a predetermined preamble waveform or a predetermined frame-sync waveform. The preamble waveform comprises a fixed-length start delimiter, a data-0 symbol, an RT calibration waveform, and a TR calibration waveform as shown in FIG. 5A. The frame-sync waveform is identical to the preamble waveform with the TR calibration waveform omitted as shown in FIG. 5B. In FIGS. 5A and 5B, "Tari" is a reference time interval (preferably between 6.25 μs and 25 μs) for Interrogator-to-Tag downlink signaling and is the duration of the data-0 symbol. The duration of the data-1 symbol is in a range between 1.5*Tari and 2.0*Tari. The pulse of the data-0 symbol and the data-1 symbol occurs at the end of the respective symbol with a pulsewidth PW that is preferably less than 0.525*Tari and greater than the maximum of 0.265*Tari and 2 μs. The duration of the RT calibration waveform is equal to the duration of the data-0 symbol plus the duration of a data-1 symbol, which provides a total duration in a range between 2.5*Tari and 3.0*Tari. The Tag measures the length of the RT calibration waveform and uses this measurement for interpreting subsequent symbols communicated from the Interrogator to the Tag. The preamble waveform of FIG. 5A precedes each Query command transmitted from the Interrogator 12 to the Tag 14. The frame-synch waveform of FIG. 5B precedes all other commands (e.g., Select, ACK, Read, Write, Kill) transmitted from the Interrogator 12 to the Tag 14.

Figure 6A:
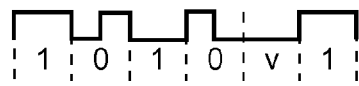
FIGS. 6A and 6B are pictorial illustrations of two different preamble waveforms that precede one or more reply data fields as part of Tag-to-Interrogator signaling in the RFID system of FIG. 1 in those instances where FM0 Tag-to-Interrogator signaling is employed.
Figure 6B:
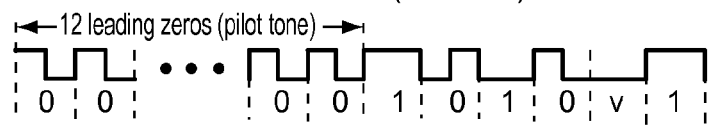
Figure 6C:
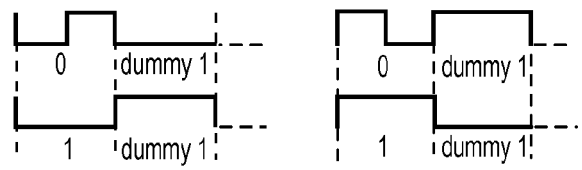
FIG. 6C is a pictorial illustration of an end-of-signaling waveform that terminates FM0 Tag-to-Interrogator signaling.

For uplink communications employing FM0 baseband signaling, the Tag 14 initiates Tag-to-Interrogator signaling by generating one of the two preambles shown in FIGS. 6A and 6B. The preamble selection is dictated by the value of a predetermined bit (i.e., the TRext bit) in the Query command communicated from the Interrogator 12 to the Tag 14. The "v" shown in the FIGS. 6A and 6B indicates a signaling violation (i.e., a phase inversion should have occurred but did not). The end of the FM0 Tag-to-Interrogator signaling ends with a "dummy" data-1 symbol as shown in FIG. 6C. The data rate of the FM0 Tag-to-Interrogator signaling can vary between 40 kbps and 640 kbps. This data rate is selected by the Interrogator by the length of the TR calibration waveform (FIG. 5A) and a predetermined bit (i.e., the DR bit) in the Query command communicated from the Interrogator 12 to the Tag 14.

Figure 7A:
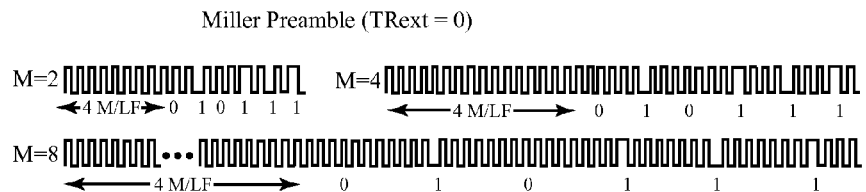
FIGS. 7A and 7B are pictorial illustrations of two different sets of preamble waveforms that precede one or more reply data fields as part of Tag-to-Interrogator signaling in the RFID system of FIG. 1 in those instances where Miller-modulated Tag-to-Interrogator signaling is employed.
Figure 7B:
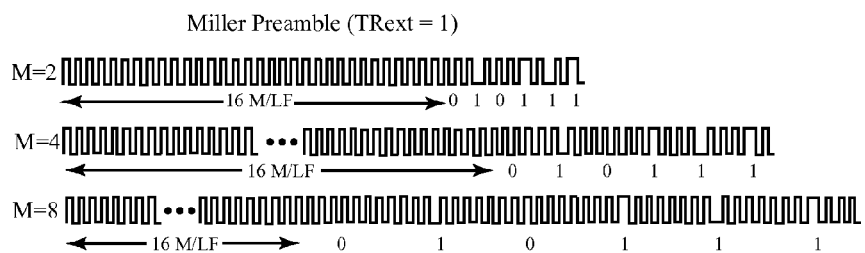
Figure 7C:
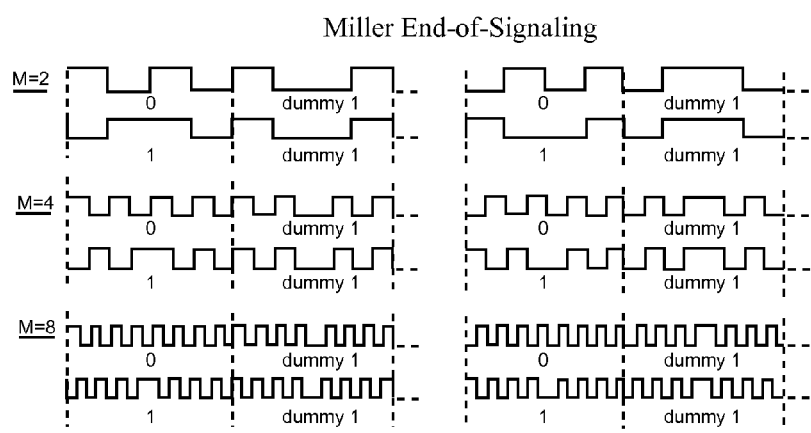
FIG. 7C is a pictorial illustration of an end-of-signaling waveform that terminates Miller-modulated Tag-to-Interrogator signaling.

For uplink communication employing Miller-modulated subcarrier signaling, the Tag 14 initiates Tag-to-Interrogator signaling by generating one of the six preambles shown in FIGS. 7A and 7B. The preamble selection is selected by the value of predetermined bits (i.e., the TRext bit and the 2-bit M field) in the Query command communicated from the Interrogator 12 to the Tag 14. The end of the Miller-modulated subcarrier Tag-to-Interrogator signaling ends with a "dummy" data-1 symbol as shown in FIG. 7C. The data rate of the Miller-modulated subcarrier Tag-to-Interrogator signaling can vary between 5 kbps and 320 kbps. This data rate is selected by the Interrogator 12 by the length of the TR calibration waveform (FIG. 5A) and predetermined bits (i.e., the DR bit and the 2-bit M field) in the Query command communicated from the Interrogator 12 to the Tag 14.

Returning back to FIG. 1, the receiver subsystem of the Interrogator employs homodyne detection wherein the modulated RF carrier signal is received at the Antenna 30 and amplified with a low noise amplifier 32 whose output is mixed by a quadrature mixer 34 that uses the same RF signal source 22 as the transmit functionality. The in-phase (I) and quadrature (Q) components output from the quadrature phase mixer 34 are low-pass filtered (blocks 36A, 36B) to generate an in-phase signal $r_c(t)$ and a quadrature signal $r_s(t)$ that encode the FM0 waveform or Miller subcarrier waveform. A data recovery circuit 38 processes the $r_c(t)$ and $r_s(t)$ signals in order to decode the FM0 or Miller-subcarrier waveform therein and recover the bit clock timing related thereto, thereby reproducing the Tag's Uplink Information Signal 40. The data recovery circuit 38 can be realized in many different ways including analog, digital, and hybrid analog/digital implementations.

Figure 8:
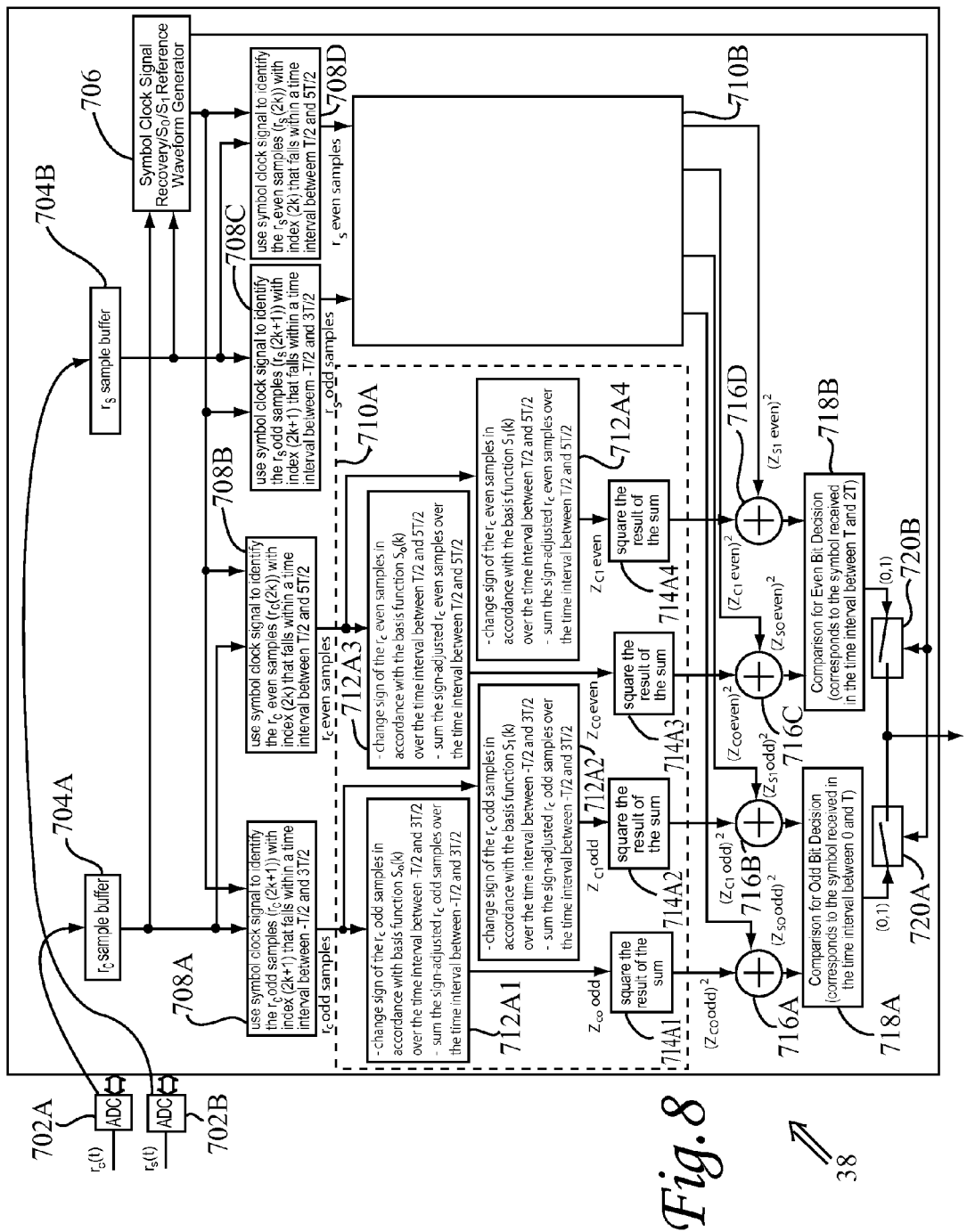
FIG. 8 is a functional block diagram of a digital implementation of the data recovery circuit of FIG. 1 in accordance with the present invention.

FIG. 8 illustrates an exemplary embodiment of a digital implementation of the data recovery circuit 38 for decoding the FM0 waveform and recovering the bit clock timing of the FM0 waveform according to the invention. The implementation includes analog-to-digital conversion circuitry (blocks 702A, 702B) that sample the $r_c(t)$ and $r_s(t)$ signals preferably at more than twice the Nyquist frequency (i.e., more than twice the data rate of the FM0 signaling, which can vary between 40 kbps and 640 kbps). In the preferred embodiment, the $r_c(t)$ and $r_s(t)$ signals are sampled at eight times the data rate of the FM0 signaling. The in-phase samples and the quadrature phase samples, which are each represented by a binary NRZ value [1, −1], are stored in sample buffers 704A and 704B, respectively. The in-phase samples and the quadrature phase samples are supplied to a symbol clock recovery block 706 that processes the time-sequential samples to generate a symbol clock signal that is substantially synchronous to the transitions between symbols in the FM0 waveform. Thus, the symbol clock signal has a rate that corresponds to the data rate of the FM0 waveform. Such symbol clock recovery can be accomplished in many different ways well known in the communications arts. More particularly, preamble processing is employed for initial synchronization (including signal parameter estimation and symbol timing). Typically, a conventional correlation algorithm (or a simple zero-crossing algorithm) provides precise estimation of symbol timing. During data transmission, one or more synchronization tracking algorithms may be used for timing adjustment. These algorithms are typically based on closed-looped estimators that employ narrow-bandwidth filtration. Details of these symbol synchronization mechanisms is described in detail in Proakis, "Digital Communications", McGraw-Hill, 2000, Section 6.3, herein incorporated by reference in its entirety.

According to the invention, the symbol stream encoded in the FM0 waveform can be logically partitioned into a sequence of odd/even symbol pairs. The even symbols correspond to particular in-phase samples $r_c(2k)$ of the $r_c$ sample buffer and also correspond to particular quadrature phase samples $r_s(2k)$ of the $r_s$ sample buffer, where k is an integer sequence 0, 1, 2, 3, . . . . The odd symbols correspond to the particular in-phase samples $r_c(2k+1)$ of the $r_c$ sample buffer and also correspond to particular quadrature phase samples $r_s(2k+1)$ of the $r_s$ sample buffer. In the preferred embodiment where the $r_c(t)$ and $r_s(t)$ signals are sampled at eight times the data rate of the FM0 signaling, each odd symbol corresponds to eight successive in-phase samples and eight successive quadrature phase samples, while each even symbol corresponds to the next eight successive in-phase samples and the next eight successive quadrature phase samples. For each odd/even symbol pair, the odd symbol occurs within a time interval between 0 and T and the even symbol occurs within a time interval between T and 2T. The duration of these time intervals is inversely proportional to the data rate of the FM0 waveform, which is selected by downlink communication from the Interrogator 12 to the Tag 14.

The symbol clock signal generated by the symbol clock recovery block 706 is used in eight signal processing paths that operate to decode an odd/even symbol pair in parallel. Four of the eight paths process the in-phase samples (block 710A) while the other four paths process the quadrature phase samples (block 710B).

The four paths that process the in-phase samples (block 710A) can be logically divided into two groups with two paths per group. In accord with the invention, one group operates on in-phase samples that fall within an extended processing window corresponding to the −T/2 to 3T/2 time interval for the odd symbol of the pair (blocks 712A1 and 712A2). The other group operates on in-phase samples that fall within an extended processing window corresponding to the T/2 to 5T/2 time interval for the even symbol of the pair (blocks 712A3 and 712A4).

Similarly, the four paths that process the quadrature phase samples $r_s(k)$ (block 710B) can be logically divided into two groups with two paths per group. One group (not shown) operates on quadrature phase samples that fall within an extended processing window corresponding to the −T/2 to 3T/2 time interval for the odd symbol of the pair. The other group (not shown) operates on quadrature phase samples that fall within an extended processing window corresponding to the T/2 and 5T/2 time interval for the even symbol of the pair.

In the first path (blocks 712A1 and 714A1), the in-phase samples that fall within the −T/2 to 3T/2 processing window are samplewise multiplied by an $S_0$ odd symbol basis function. In the digital domain (block 712A1), these operations are carried out by changing the sign of the in-phase samples in accordance with the value of the corresponding part of the $S_0$ odd symbol basis function (FIG. 9B) as follows:

| Sample | Basis function | Sign-adjusted Sample |
|---|---|---|
| −1 | −1 | 1 (Sign Flips) |
| −1 | 1 | −1 (No Change) |
| 1 | −1 | −1 (Sign Flips) |
| 1 | 1 | 1 (No Change) |

The results of the samplewise multiplication are accumulated. In the digital domain, this operation is carried out by summing the sign-adjusted in-phase samples over the −T/2 to 3T/2 processing window. The result of the accumulation denoted $Z_{c0}$ odd is then squared in block 714A1. Alternatively, the absolute value of the accumulation result $Z_{c0}$ odd may be calculated in block 714A1.

Figure 10B:
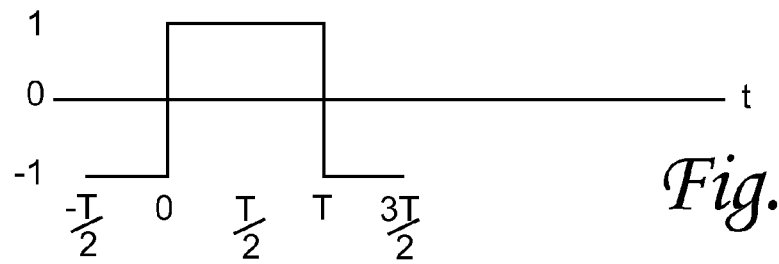
FIG. 10B is a pictorial illustration of an $S_1$-odd basis function, which corresponds to the data=1 symbol of the FM0 signal format and which is used for decoding of odd symbols in the data recovery circuit of FIG. 8.

In the second path (blocks 712A2 and 714A2), the in-phase samples that fall within the −T/2 to 3T/2 processing window are samplewise multiplied by an $S_1$ odd symbol basis function (FIG. 10B). In the digital domain (block 712A2), these operations are carried out by changing the sign of the in-phase samples in accordance with the value of the corresponding part of the $S_1$ odd symbol basis function as set forth above. The results of the samplewise multiplication are accumulated. In the digital domain, this operation is carried out by summing the sign-adjusted in-phase samples over the −T/2 to 3T/2 processing window. The result of the accumulation denoted $Z_{c1}$ odd is then squared in block 714A2. Alternatively, the absolute value of the accumulation result $Z_{c1}$ odd may be calculated in block 714A2.

Figure 9B:
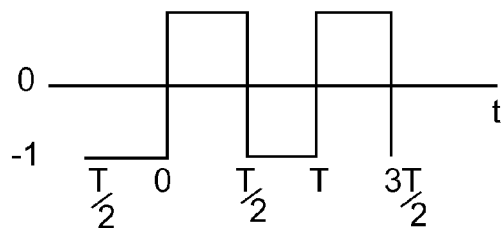
FIG. 9B is a pictorial illustration of an $S_0$-odd basis function, which corresponds to the data=0 symbol of the FM0 signal format and which is used for decoding of odd symbols in the data recovery circuit of FIG. 8.
Figure 9C:
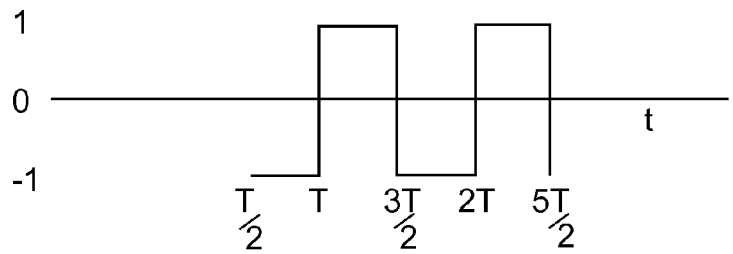
FIG. 9C is a pictorial illustration of an $S_0$-even basis function, which corresponds to the data=0 symbol of the FM0 signal format and which is used for decoding of even symbols in the data recovery circuit of FIG. 8.

In the third path (blocks 712A3 and 714A3), the in-phase samples that fall within the T/2 to 5T/2 processing window are samplewise multiplied by the $S_0$ even symbol basis function (FIG. 9C). In the digital domain (block 712A3), these operations are carried out by changing the sign of the in-phase samples in accordance with the value of the corresponding part of the $S_0$ even symbol basis function as set forth above. The results of the samplewise multiplication are accumulated. In the digital domain, this operation is carried out by summing the sign-adjusted in-phase samples over the T/2 to 5T/2 processing window. The result of the accumulation denoted $Z_{c0}$ even is then squared in block 714A3. Alternatively, the absolute value of the accumulation result $Z_{c0}$ even may be calculated in block 714A3.

Figure 10C:
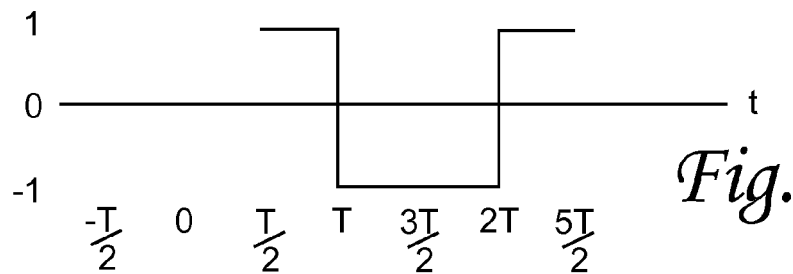
FIG. 10C is a pictorial illustration of an $S_1$-even basis function, which corresponds to the data=1 symbol of the FM0 signal format and which is used for decoding of even symbols in the data recovery circuit of FIG. 8.

In the fourth path (blocks 712A4 and 714A4), the in-phase samples that fall within the T/2 to 5T/2 processing window are samplewise multiplied by an $S_1$ even symbol basis function (FIG. 10C). In the digital domain (block 712A4), these operations are carried out by changing the sign of the in-phase samples in accordance with the value of the corresponding part of the $S_1$ even symbol basis function as set forth above. The results of the samplewise multiplication are accumulated. In the digital domain, this operation is carried out by summing the sign-adjusted in-phase samples over the T/2 to 5T/2 processing window. The result of the accumulation denoted $Z_{c1}$ even is then squared in block 714A4. Alternatively, the absolute value of the accumulation result $Z_{c1}$ even may be calculated in block 714A4.

In block 710B, the operations of blocks 712A1 to 714A4 as described above are performed on corresponding quadrature samples to thereby realize the other four processing paths.

Figure 9A:
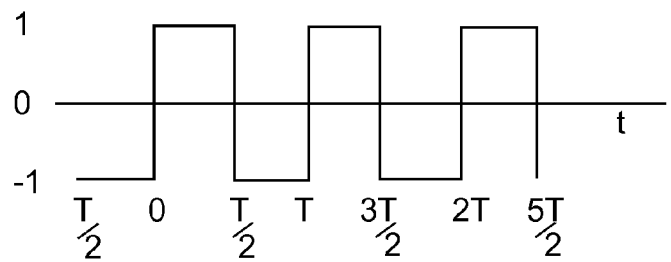
FIG. 9A is a pictorial illustration of a composite $S_0$ basis function, which is the composite of the $S_0$-odd basis function of FIG. 9B and the $S_0$-even basis function of FIG. 9C.

The $S_0$ odd symbol basis function (which is a window of the composite $S_0$ basis function shown in FIG. 9A) is shown in FIG. 9B. Note that the $S_0$ odd symbol basis function is a square wave that corresponds to the FM0 data-0 symbol of FIG. 3A1 over the time interval between 0 and T with a phase inversion for the interval 0 to −T/2 and a phase inversion in the interval from T to 3T/2. In this manner, the $S_0$ odd symbol basis function maintains the FM0 signaling rule that a phase inversion occur at the symbol boundaries.

The $S_0$ even symbol basis function (which is a different window of the composite $S_0$ basis function) is shown in FIG. 9C. Note that the $S_0$ even symbol basis function is a square wave that corresponds to the FM0 data-0 symbol of FIG. 3A1 over the time interval between T and 2T with a phase inversion for the interval T to T/2 and a phase inversion in the interval from 2T to 5T/2. In this manner, the $S_0$ even symbol basis function maintains the FM0 signaling rule that a phase inversion occur at the symbol boundaries.

FIG. 9A shows the composite $S_0$ basis function, which is the composite of the $S_0$ odd symbol basis function (FIG. 9B) and the $S_0$ even symbol basis function (FIG. 9C).

Figure 10A:
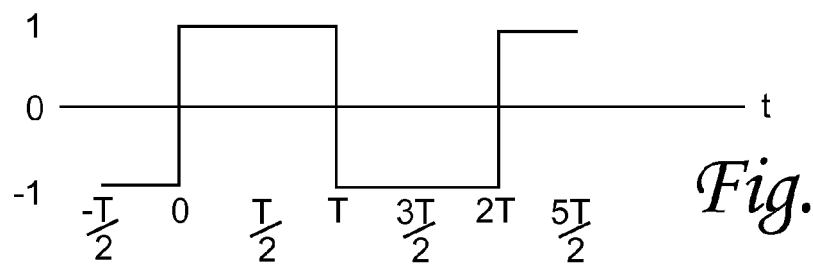
FIG. 10A is a pictorial illustration of a composite $S_1$ basis function, which is the composite of the $S_1$-odd basis function of FIG. 10B and the $S_1$-even basis function of FIG. 10C.

The $S_1$ odd symbol basis function (which is a window of the composite $S_1$ basis function shown in FIG. 10A) is shown in FIG. 10B. Note that the $S_1$ odd symbol basis function is a square wave that corresponds to the FM0 data-1 symbol of FIG. 3A2 over the time interval between 0 and T with a phase inversion for the interval 0 to −T/2 and a phase inversion in the interval from T to 3T/2. In this manner, the $S_1$ odd symbol basis function maintains the FM0 signaling rule that a phase inversion occur at the symbol boundaries.

The $S_1$ even symbol basis function (which is a different window of the composite $S_1$ basis function) is shown in FIG. 10C. Note that the $S_1$ even symbol basis function is a square wave that corresponds to the FM0 data-1 symbol of FIG. 3A2 over the time interval between T and 2T with a phase inversion for the interval T to T/2 and a phase inversion in the interval from 2T to 5T/2. In this manner, the $S_1$ even symbol basis function maintains the FM0 signaling rule that a phase inversion occur at the symbol boundaries.

FIG. 10A shows the composite $S_1$ basis function, which is the composite of the $S_1$ odd symbol basis function (FIG. 10B) and the $S_1$ even symbol basis function (FIG. 10C).

In essence, the samplewise multiplication and accumulation operations carried out in each one of the eight processing paths of blocks 710A and 710B are digital equivalents of a matched filter implementation over a two symbol period (i.e., over a 2T period). The squaring function (or absolute value function) maps the accumulation results of each respective path into positive numbers such the accumulation results can be effectively combined. The outputs of the squaring functions (or absolute value functions) from complementary paths are summed together. In this manner, block 716A sums the squared accumulation results (or the absolute value of such accumulated results) for the $Z_{c0}$ odd processing path (blocks 712A1 and 714A1) and the $Z_{s0}$ odd processing path (not shown) in block 710B, block 716B sums the squared accumulation results (or the absolute value of such accumulation results) for the $Z_{c1}$ odd processing path (blocks 712A2 and 714A2) and the $Z_{s1}$ odd processing path (not shown) in block 710B, block 716C sums the square accumulation results (or the absolute value of such accumulation results) for the $Z_{c0}$ even processing path (blocks 712A3 and 714A3) and the $Z_{s0}$ even processing path (not shown) in block 710B, and block 716D sums the squared accumulation results (or the absolute value of such accumulation results) for the $Z_{c1}$ even processing path (blocks 712A4 and 714A4) and the $Z_{s1}$ even processing path (not shown) in block 710B.

The output (Z0odd) of adder block 716A and the output (Z1odd) of adder block 716B are supplied to comparison logic 718A that assigns a binary value of 0 or 1 for the odd symbol based thereon. Such assignment is preferably realized by the following comparison operations:

if (Z0odd > Z1odd), then the odd symbol
    is assigned to binary value 0;
       else the odd symbol is assigned to binary value 1
endif;
where Z0odd is the output of the adder block 716A and Z1odd is the output of the adder block 716B.

Similarly, the output (Z0even) of adder block 716C and the output (Z1even) of adder block 716D are supplied to comparison logic 718B that assigns a binary value of 0 or 1 for the even symbol based thereon. Such assignment is preferably realized by the following comparison operations:

if (Z0even > Z1even), then the even symbol
    is assigned to binary value 0;
       else the even symbol is assigned to binary value 1
endif;
where Z0even is the output of the adder block 716C and Z1even is the output of the adder block 716D.

Controls signals, which are synchronized to the symbol clock timing, are supplied by the symbol clock recovery block 706 to multiplexers 720A, 720B such that odd bit value is output for the odd symbol time period (0 to T) and the even bit value is output for the even symbol time period (T to 2T). In this manner, the output of the multiplexers 720A, 720B provides bit estimates for each odd/even symbol pair in the Tag's Uplink Information Signal 40.

The bit estimates output by the multiplexers 720A, 720B may optionally be loaded into a post-processing block (not shown) that processes the estimates to cancel interference (such as co-channel interference or multi-path interference), an example of which is set forth in US 2004/0014424 to Kristensson et al, herein incorporated by reference in its entirety. Such post-processing may also provide for error correction, which is typically realized by Reed-Solomon decoding or convolutional decoding as part of Viterbi processing.

After data recovery is complete, the bit stream that represents the Tag's Uplink Information Signal 40 is stored in a buffer for communication to the processor 16 for subsequent processing.

The data processing blocks of FIG. 8 are preferably part of a digital signal processing platform 721, which may be realized by a digital signal processor, an FPGA, an ASIC or other suitable data processing means.

FIGS. 11A through 11E illustrate the signal processing operations of the data recovery circuit of FIG. 8.

Figures 11A, 11B, 11C, 11D, 11E:
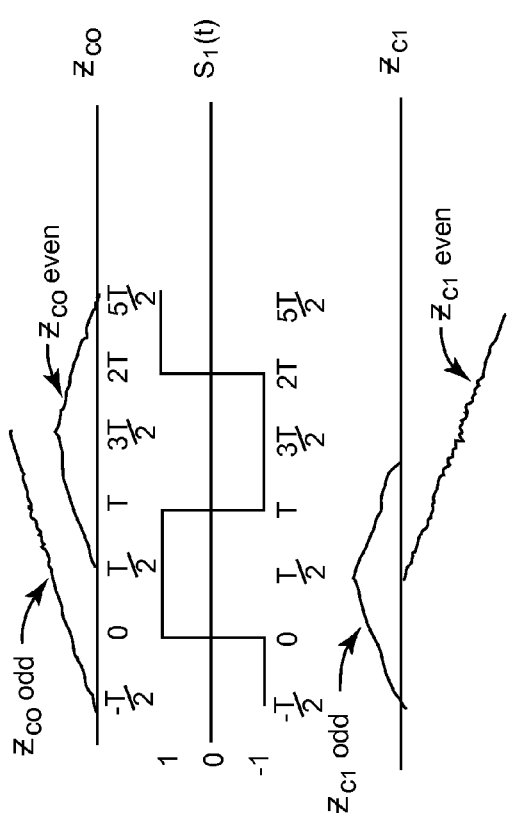
FIGS. 11A to 11E are signal waveforms that describe the signal processing operations carried out by the data recovery circuit of FIG. 8.

FIG. 11A illustrates an ideal $r_c(t)$ signal that encodes an odd/even symbol pair [0,1].

FIG. 11B illustrates the composite $S_0$ basis function (FIG. 9A). Samples of the $r_c(t)$ signal that are received within the −T/2 to 3T/2 processing window are samplewise multiplied (e.g., sign changed) by the portion of the composite $S_0$ basis function for the time interval between −T/2 and 3T/2 (i.e., the $S_0$ odd symbol basis function of FIG. 9B) and the results accumulated to generate the $Z_{c0}$odd signal as shown in FIG. 11C. Samples of the $r_c(t)$ signal that are received within the T/2 to 5T/2 processing window are samplewise multiplied (e.g., sign changed) by the portion of the composite $S_0$ basis function for the time interval between T/2 and 5T/2 (i.e., the $S_0$ even symbol basis function of FIG. 9C) and the results accumulated to generate the $Z_{c0}$even signal as shown in FIG. 11c.

FIG. 11D illustrates the composite $S_1$ basis function (FIG. 10A). Samples of the $r_c(t)$ signal that are received within the −T/2 to 3T/2 processing window are samplewise multiplied (e.g., sign changed) by the portion of the composite $S_1$ basis function for the time interval between −T/2 and 3T/2 (i.e., the $S_1$ odd symbol basis function of FIG. 10B) and the results accumulated to generate the $Z_{c1}$odd signal as shown in FIG. 11E. Samples of the $r_c(t)$ signal that are received within the T/2 to 5T/2 processing window are samplewise multiplied (e.g., sign changed) by the portion of the composite $S_1$ basis function for the time interval between T/2 and 5T/2 (i.e., the $S_1$even symbol basis function of FIG. 10C) and the results accumulated to generate the $Z_{c1}$even signal as shown in FIG. 11D.

The signal processing operations of blocks 710A and 710B generate complementary results. In other words, $Z_{s0}$odd corresponds to $Z_{c1}$odd, $Z_{s1}$odd corresponds to $Z_{c0}$odd, $Z_{s0}$even corresponds to $Z_{c1}$even, and $Z_{s1}$even corresponds to $Z_{c0}$even. The signal level of the accumulation results at the end of the respective processing windows (at 3T/2 or 5T/2) are mapped to positive values by squaring (or by absolute value functions) and then summed together in complementary pairs. The result sums are then used as input to the comparison logic for bit level assignment.

Figure 12:
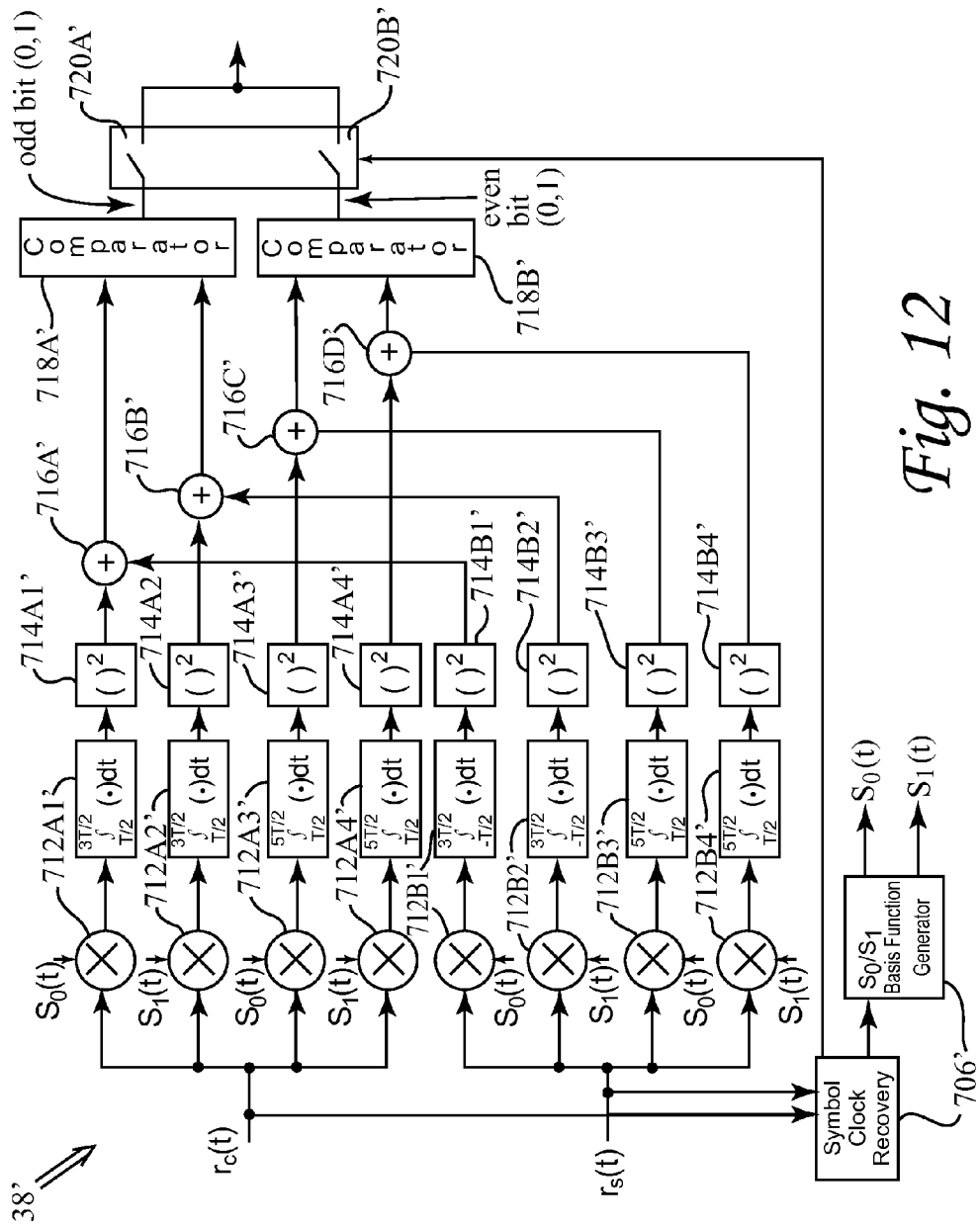
FIG. 12 illustrates an analog implementation of the data recovery circuit of FIG. 8 with like numerals designating analog-forms of the signal processing functionality shown therein.

FIG. 12 illustrates an analog implementation of the data recovery circuit of FIG. 8 with like numerals designating analog-forms of the signal processing functionality described above. Note that in the analog implementation, the samplewise multiplication operations are carried out by analog multipliers and the accumulation operations are carried out by integration circuitry.

Figure 13:
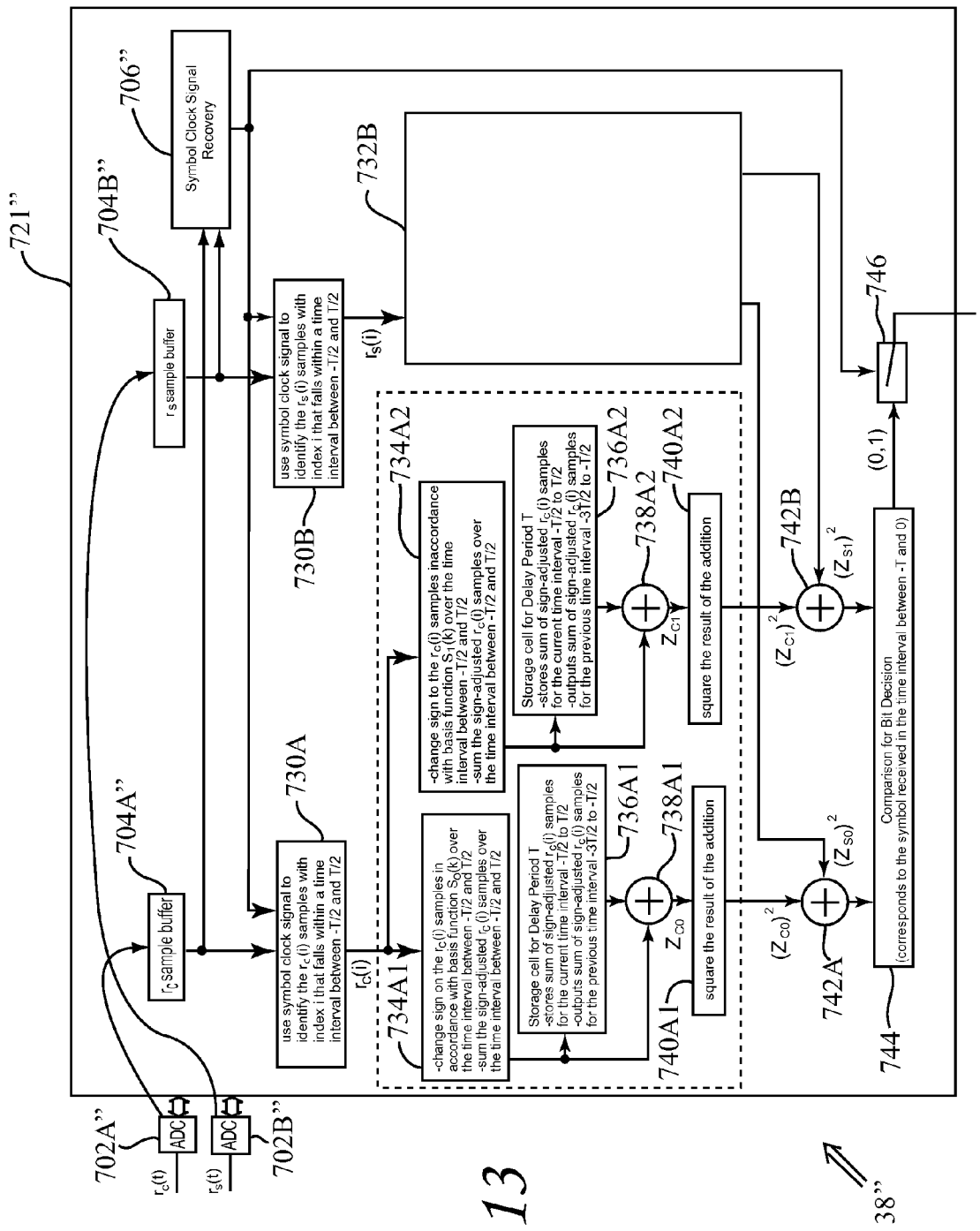
FIG. 13 illustrates an alternate embodiment of the data recovery circuit of FIG. 1 in accordance with the present invention.

FIG. 13 illustrates an alternate digital implementation for the data recovery circuit 38 for decoding the FM0 waveform and recovering the bit clock timing of the FM0 waveform. The implementation includes analog-to-digital conversion circuitry (blocks 702A″, 702B″) that sample the $r_c(t)$ and $r_s(t)$ signals at preferably more than twice the Nyquist frequency (i.e., more than twice the data rate of the FM0 signaling, which can vary between 40 kbps and 640 kbps). In the preferred embodiment, the $r_c(t)$ and $r_s(t)$ signals are sampled at eight times the data rate of the FM0 signaling. The in-phase samples and the quadrature phase samples, which are each represented by a binary NRZ value [1, −1], are stored in sample buffers 704A″ and 704B″, respectively. The in-phase samples and the quadrature phase samples are supplied to a symbol clock recovery block 706″ that processes the time-sequential samples to generate a symbol clock signal that is substantially synchronous to the transitions between symbols in the FM0 waveform. Thus, the symbol clock signal has a rate that corresponds to the data rate of the FM0 waveform. Such symbol clock recovery can be accomplished in many different ways well known in the communications arts as described above. The symbol clock signal generated by the symbol clock recovery block 706″ is used in four signal processing paths that operate to decode symbols. Two of the four paths process the in-phase samples (block 732A) while the other two paths process the quadrature phase samples (block 732B).

In the first path of block 732A (blocks 734A1, 736A1, 738A1, 740A1), the in-phase samples that fall within the −T/2 to T/2 processing window are samplewise multiplied by the $S_0$ basis function. In the digital domain (block 734A1), these operations are carried out by changing the sign of the in-phase samples in accordance with the value of the corresponding part of the $S_0$ basis function as follows:

| Sample | Basis function | Sign-adjusted Sample |
|---|---|---|
| −1 | −1 | 1 (Sign Flips) |
| −1 | 1 | −1 (No Change) |
| 1 | −1 | −1 (Sign Flips) |
| 1 | 1 | 1 (No Change) |

The results of the samplewise multiplication are accumulated. In the digital domain, this operation is carried out by summing the sign-adjusted in-phase samples over the −T/2 to T/2 processing window. The result of the accumulation of block 734A1 is stored in a storage cell in block 736A1. The accumulation results written to the storage cell in the previous processing window (the time interval −3T/2 to −T/2) are output and added to the accumulation results for the current processing window (the time interval −T/2 to T/2) in block 738A1. The sum denoted $Z_{c0}$ is then squared in block 740A1. Alternatively, the absolute value of the sum $Z_{c0}$ may be calculated in block 740A1.

In the second path (blocks 734A2, 736A2, 738A2, 740A2), the in-phase samples that fall within the −T/2 to T/2 processing window are samplewise multiplied by the $S_1$ basis function. In the digital domain (block 734A2), these operations are carried out by changing the sign of the in-phase samples in accordance with the value of the corresponding part of the $S_1$ basis function as described above. The results of the samplewise multiplication are accumulated. In the digital domain, this operation is carried out by summing the sign-adjusted in-phase samples over the −T/2 to T/2 processing window. The result of the accumulation of block 734A2 is stored in a storage cell in block 736A2. The accumulation results written to the storage cell in the previous processing window (the time interval −3T/2 to −T/2) are output and added to the accumulation results for the current processing window (the time interval −T/2 to T/2) in block 738A2. The sum denoted $Z_{c1}$ is then squared in block 740A2. Alternatively, the absolute value of the sum $Z_{c1}$ may be calculated in block 740A2.

In block 732B, the operations of blocks 734A1 to 740A2 as described above are performed on corresponding quadrature samples to thereby realize the other two processing paths.

The $S_0$ basis function is shown in FIG. 9A. The $S_1$ basis function is shown in FIG. 10A. In essence, the multiplication, accumulation and storage cell access operations carried out in each one of the four processing paths of blocks 732A and 732B are digital equivalents of a matched filter implementation over a two symbol period (i.e., over a 2T period) which is dictated by two successive processing windows that extend from −T/2 to 3T/2. The squaring function (or absolute value function) maps the accumulation results of each respective path into positive numbers such the accumulation results can be effectively combined. The outputs of the squaring functions (or absolute value functions) from complementary paths are summed together. In this manner, block 742A sums the squared accumulation results (or the absolute value of such accumulated results) for the $Z_{c0}$ processing path (blocks 734A1, 736A1, 738A1, 740A1) and the $Z_{s0}$ processing path (not shown) in block 732B, and block 742B sums the squared accumulation results (or the absolute value of such accumulation results) for the $Z_{c1}$ processing path (blocks 734A2, 736A2, 738A2, 740A2) and the $Z_{s1}$ processing path (not shown) in block 732B.

The output (Z0) of adder block 742A and the output (Z1) of adder block 742B are supplied to comparison logic 744 that assigns a binary value of 0 or 1 for the current symbol based thereon. Such assignment is preferably realized by the following comparison operations:

--- if (Z0 > Z1), then the current symbol
    is assigned to binary value 0;
  else the current symbol is assigned to binary value 1
endif;
where Z0 is the output of the adder block 742A and Z1 is the output of the adder block 742B.

---

Controls signals, which are synchronized to the symbol clock timing, are supplied by the symbol clock recovery block 706" to multiplexer 746 such that bit value is output for the current symbol time period (0 to T). Such operations are repeated for successive processing windows. In this manner, the output of the multiplexer 746 provides bit estimates for successive symbols in the Tag's Uplink Information Signal 40.

The bit estimates output by the multiplexer 746 may optionally be loaded into a post-processing block (not shown) that processes the estimates to cancel interference (such as co-channel interference or multi-path interference) as described above.

The data recovery circuitry described herein also preferably includes functionality that performs demodulation and decoding of the Miller-modulated signaling. Such functionality is typically realized by a phase-lock loop architecture that recovers the baseband Miller waveforms from the Miller-modulated subcarrier signal and data detection circuitry that processes the baseband Miller waveforms to assign bit levels thereto. Any other suitable implementation can be used as well. Alternatively, the data recovery circuitry can omit functionality that performs demodulation and decoding of the Miller-modulated signaling and thus perform dedicated FM0 decoding.

Advantageously, the in-phase and quadrature signal processing paths of the Interrogator's data recovery circuit allows for accurate decoding where there is phase error between the CW RF carrier transmitted by the Interrogator 12 and the received modulated CW RF carrier, which typically results in multipath environments. Moreover, the multiplication and integration operations over the extended processing window of 2T symbol periods enhances the knowledge of the energy of the signal as well as the noise process of the communication channel. These enhancements increase the signal to noise ratio of the receiver subsystem, which allows for decreased signal power at the Tag (or increased read range of the system) in order to maintain a prescribed bit error rate. The decreased signal power at the Tag is typically realized by a smaller Tag antenna, which allows for a reduction in the size and costs of the Tag.

These enhancements result from the architecture of the data recovery circuit as well as properties of the $S_0$ basis function and $S_1$ basis function employed therein. More particularly, the $S_0$ basis function (FIG. 9A) has a period of T and the $S_1$ basis function (FIG. 10A) has a period of 2T. Thus, the composite $S_1$ basis function has a period twice that of the composite $S_0$ basis function. In addition, each basis function is orthogonal in nature in that its mean is zero over its respective period. In other words, the integral of each basis function over its respective period is zero. These properties improve the performance of the receiver in multipath environments by canceling out errors (including phase delays and amplitude variations) that arise in such multipath environments.

There have been described and illustrated herein an exemplary embodiment of an Interrogator of an RFID system and improved symbol decoding mechanisms therein. While particular embodiments of the invention have been described, it is not intended that the invention be limited thereto, as it is intended that the invention be as broad in scope as the art will allow and that the specification be read likewise. Thus, while an interrogator architecture that employs a shared antenna for the transmitter and receiver has been disclosed, it will be appreciated that an interrogator architecture that employs separate transmit and receive antennas coupled by a circulator can be used as well. Also, while a particular homodyne quadrature receiver architecture has been disclosed, it will be appreciated that other receiver architectures can be used as well. In addition, while particular modulation techniques and signaling formats have been disclosed, it will be understood that other modulation techniques and signaling formats can be used. Also, while the embodiments of FIGS. 8 and 12 described herein employ separate processing paths that perform odd symbol and even symbol processing in parallel, it will be recognized that other alternatives can be used. For example, it is possible to separate the odd symbol and even symbol processing into three phases. The first phase processes the received signal components over the processing window between $-T/2$ and $T/2$. The second phase processes the received signal components over the processing window between $T/2$ and $3T/2$. The third phase processes the received signal components over the processing window between $3T/2$ and $5T/2$. The odd symbol processing is accomplished by accumulating the multiplication results over the first and second phases and adding the accumulation results of the first phase to the accumulation results of the second phase. The even symbol processing is accomplished by accumulating the multiplication results over the second and third phases and adding the accumulation results of the second phase to the accumulation results of the third phase. It will also be appreciated that the symbol decoding operations described herein can be performed over extended processing windows that are smaller than two times the symbol period T (e.g., smaller than 2T) so long as such extended processing windows are greater than T. It will therefore be appreciated by those skilled in the art that yet other modifications could be made to the provided invention without deviating from its spirit and scope as claimed.

What is claimed is:

1. In a radio frequency identification system wherein at least one tag modulates a radio frequency signal by modulated backscatter operations, wherein the modulated radio frequency signal transmitted by the at least one tag encodes a message that is represented by a sequence of symbols each corresponding to at least one bit of the message, the sequence of symbols being transmitted at a symbol rate with a corresponding symbol period, an Interrogator comprising:

a transmitter that transmits the radio frequency signal; and
    a receiver that receives, demodulates and decodes the modulated radio frequency signal in order to recover the message therein, said receiver including a symbol clock recovery circuit and a symbol decoder, said symbol clock recovery circuit deriving timing information for transitions between symbols in the sequence of symbols encoded in the message, and said symbol decoder decoding a given symbol by operating on portions of a component of the modulated radio frequency signal that are received over an extended processing window, wherein the extended processing window is greater in duration than the symbol period as dictated by the timing information derived by the symbol clock recovery circuit.

2. An Interrogator according to claim 1, wherein:
a first part of the extended processing window precedes the symbol period for given symbol, a second part of the extended processing window includes the symbol period for the given symbol, and a third part of the extended processing window follows the symbol period for the given symbol.

3. An Interrogator according to claim 1, wherein:
duration of the extended processing window is substantially two times the symbol period.

4. An Interrogator according to claim 3, wherein:
a first part of the extended processing window precedes the symbol period for given symbol, a second part of the extended processing window includes the symbol period for the given symbol, and a third part of the extended processing window follows the symbol period for the given symbol, wherein the first and third parts have respective durations that are at least one half of the symbol period.

5. An Interrogator according to claim 1, wherein:
said symbol decoder includes
　reference signal generation means for generating at least one reference signal that varies over of a time duration corresponding to the extended processing window;
　multiplication means for samplewise multiplication of portions of the component of the modulated radio frequency signal with portions of said at least one reference signal; and
　accumulation means for accumulating results of the multiplication means over the extended processing window.

6. An Interrogator according to claim 1, wherein:
said transmitter comprises an RF signal source that generates the radio frequency signal for transmission by the transmitter, and
said receiver includes a quadrature mixer for demodulating the modulated radio frequency signal received by the receiver, said quadrature mixer operably coupled to said RF signal source for homodyne demodulation.

7. An Interrogator according to claim 6, wherein:
said receiver includes low-pass filter circuitry that filters the output of the quadrature mixer to generate in-phase and quadrature signal components that are demodulated from the modulated radio frequency signal received by the receiver.

8. An Interrogator according to claim 7, wherein:
the symbol decoder decodes a given symbol by operating on portions of both the in-phase and quadrature signal components that are received over said extended processing window.

9. An Interrogator according to claim 8, wherein:
the sequence of symbols of the message are encoded by a bi-phase signal format.

10. An Interrogator according to claim 9, wherein:
said symbol decoder includes
　i) reference signal generator means for generating first and second reference signals that each vary over of respective time durations corresponding to the extended processing window, the first reference signal corresponding to a data-0 symbol type of the bi-phase signal format, and the second reference signal corresponding to a data-1 symbol type of the bi-phase signal format;
　ii) first multiplication means for samplewise multiplication of portions of the in-phase component of the modulated radio frequency signal with portions of the first reference signal, first accumulation means for accumulating results of the first multiplication means over the extended processing window, and first squaring means for squaring output of the first accumulation means;
　iii) second multiplication means for samplewise multiplication of portions of the quadrature component of the modulated radio frequency signal with portions of the first reference signal, second accumulation means for accumulating results of the second multiplication means over the extended processing window, and second squaring means for squaring output of the second accumulation means;
　iv) third multiplication means for samplewise multiplication of portions of the in-phase component of the modulated radio frequency signal with portions of the second reference signal, third accumulation means for accumulating results of the third multiplication means over the extended processing window, and third squaring means for squaring output of the third accumulation means;
　v) fourth multiplication means for samplewise multiplication of portions of the quadrature component of the modulated radio frequency signal with portions of the second reference signal, fourth accumulation means for accumulating results of the fourth multiplication means over the extended processing window, and fourth squaring means for squaring output of the fourth accumulation means;
　vi) first summing means for summing contributions of the first and second squaring means;
　vii) second summing means for summing contributions of the third and fourth squaring means; and
　viii) comparison logic for assigning bit values to the given symbol based upon output of the first and second summing means.

11. An interrogator according to claim 10, wherein:
said symbol decoder employs multiple signal processing paths for carrying out odd symbol processing in parallel with even symbol processing, said multiple signal processing paths including the set of processing elements (ii)-(viii) of claim 10 for carrying out odd symbol processing and the set of processing elements (ii)-(viii) of claim 10 for carrying out even symbol processing.

12. An interrogator according to claim 10, wherein:
the first squaring means is substituted by first means for deriving absolute value of the accumulation results of the first accumulation means;
the second squaring means is substituted by second means for deriving absolute value of the accumulation results of the second accumulation means;
the third squaring means is substituted by third means for deriving absolute value of the accumulation results of the third accumulation means; and
the fourth squaring means is substituted by fourth means for deriving absolute value of the accumulation results of the fourth accumulation means.

13. An Interrogator according to claim 9, wherein:
said symbol decoder includes i) reference signal generator means for generating first and second reference signals that each vary over of respective time durations corresponding to the extended processing window, the first reference signal corresponding to a data-0 symbol type of the bi-phase signal format, and the second reference signal corresponding to a data-1 symbol type of the bi-phase signal format;

ii) first multiplication means for samplewise multiplication of portions of the in-phase component of the modulated radio frequency signal with portions of the first reference signal, first accumulation means for accumulating results of the first multiplication means over a processing window of a duration corresponding to the symbol period, a first storage cell for storing the accumulation results of the first accumulation means during the current processing window and outputting the accumulation results of the first accumulation means from the previous processing window, first summing means for summing the accumulation results of the first accumulation means in the current processing window and the accumulation results from the previous processing window output from the first storage cell, and first squaring means for squaring output of the first summing means;

iii) second multiplication means for samplewise multiplication of portions of the quadrature phase component of the modulated radio frequency signal with portions of the first reference signal, second accumulation means for accumulating results of the second multiplication means over a processing window of a duration corresponding to the symbol period, a second storage cell for storing the accumulation results of the second accumulation means during the current processing window and outputting the accumulation results of the second accumulation means from the previous processing window, second summing means for summing the accumulation results of the second accumulation means in the current processing window and the accumulation results from the previous processing window output from the second storage cell, and second squaring means for squaring output of the second summing means;

iv) third multiplication means for samplewise multiplication of portions of the in-phase component of the modulated radio frequency signal with portions of the second reference signal, third accumulation means for accumulating results of the third multiplication means over a processing window of a duration corresponding to the symbol period, a third storage cell for storing the accumulation results of the third accumulation means during the current processing window and outputting the accumulation results of the third accumulation means from the previous processing window, third summing means for summing the accumulation results of the third accumulation means in the current processing window and the accumulation results from the previous processing window output from the third storage cell, and third squaring means for squaring output of the third summing means;

v) fourth multiplication means for samplewise multiplication of portions of the quadrature phase component of the modulated radio frequency signal with portions of the second reference signal, fourth accumulation means for accumulating results of the fourth multiplication means over a processing window of a duration corresponding to the symbol period, a fourth storage cell for storing the accumulation results of the fourth accumulation means during the current processing window and outputting the accumulation results of the fourth accumulation means from the previous processing window, fourth summing means for summing the accumulation results of the fourth accumulation means in the current processing window and the accumulation results from the previous processing window output from the fourth storage cell, and fourth squaring means for squaring output of the fourth summing means;

vi) fifth summing means for summing contributions of the first and second squaring means;

vii) sixth summing means for summing contributions of the third and fourth squaring means; and viii) comparison logic for assigning bit values to a given symbol based upon output of the fifth and sixth summing means.

14. An interrogator according to claim 13, wherein:
the first squaring means is substituted by first means for deriving absolute value of the output of the first summing means;
the second squaring means is substituted by second means for deriving absolute value of the output of the second summing means;
the third squaring means is substituted by third means for deriving absolute value of the output of the third summing means; and
the fourth squaring means is substituted by fourth means for deriving absolute value of the output of the fourth summing means.

15. An interrogator according to claim 9, wherein:
the modulated radio frequency signal transmitted by the at least one tag employs one of amplitude shift keying modulation and phase shift keying modulation.

16. An Interrogator according to claim 10, wherein:
the data-0 symbol and the data-1 symbol of the bi-phase signal each have transitions that occur at the beginning and end boundaries of the respective symbol.

17. An Interrogator according to claim 9, wherein:
the symbol rate of the bi-phase signaling can vary between 40 kbps and 640 kbps as dictated by downlink communication from the Interrogator to the at least one tag.

18. An Interrogator according to claim 17, wherein:
the symbol rate of the bi-phase signaling is selected by the length of a predetermined calibration waveform communicated from the Interrogator to the at least one tag.

19. An Interrogator according to claim 10, wherein:
the first reference signal is a squarewave with a period T equal to the symbol period T; and
the second reference signal is a squarewave with a period 2T equal to two times the symbol period T.

20. An Interrogator according to claim 19, wherein:
the first reference signal is orthogonal in manner that its mean over its period T is zero; and
the second reference signal is orthogonal in a manner that its mean over its 2T period is zero.

21. In a radio frequency identification system wherein at least one tag modulates a radio frequency signal by modulated backscatter operations, wherein the modulated radio frequency signal transmitted by the at least one tag encodes a message that is represented by a sequence of symbols each corresponding to at least one bit of the message, the sequence of symbols being transmitted at a symbol rate with a corresponding symbol period, a method for receiving the modulated radio frequency signal comprising:

receiving the modulated radio frequency signal at an antenna;

amplifying components of the received modulated radio frequency signal;

demodulating the amplified components of received modulated radio frequency signal;

deriving timing information for transitions between symbols in the sequence of symbols encoded in the message; and decoding a given symbol by operating on portions of the resultant signals produced by the demodulation over an extended processing window, wherein the extended processing window is greater in duration than the symbol period as dictated by the timing information derived by the symbol clock recovery circuit.

22. A method according to claim 21, wherein:

a first part of the extended processing window precedes the symbol period for given symbol, a second part of the extended processing window includes the symbol period for the given symbol, and a third part of the extended processing window follows the symbol period for the given symbol.

23. A method according to claim 22, wherein:

the extended processing window has a time duration that is substantially two times the symbol period.

24. A method according to claim 21, wherein:

the decoding includes generating at least one reference signal that varies over of a time duration corresponding to the extended processing window;

samplewise multiplying portions of the resultant signals of the demodulation with portions of the at least one reference signal; and accumulating results of the samplewise multiplying over the extended processing window.

25. A method according to claim 21, wherein:

the decoding involves i) multiplication of portions of the resultant signals of the demodulation with portions of at least one reference signal that varies over of a time duration corresponding to the extended processing window and ii) accumulation of results of the multiplication of i) over the extended processing window.

26. A method according to claim 21, wherein:

the timing information is encoded by a symbol clock signal that is substantially synchronous with transitions between symbols in the sequence of symbols encoded in the message.

27. An Interrogator according to claim 1, wherein:

the symbol decoder decodes a given symbol by i) multiplication of portions of a component of the modulated radio frequency signal that are received over the extended processing window with portions of at least one reference signal that varies over a time duration corresponding to the extended processing window and ii) accumulation of results of the multiplication of i) over the extended processing window.

28. An Interrogator according to claim 1, wherein:

the timing information is encoded by a symbol clock signal that is substantially synchronous with transitions between symbols in the sequence of symbols encoded in the message.

* * * * *